United States Patent [19]
Knight et al.

[11] Patent Number: 5,676,551
[45] Date of Patent: Oct. 14, 1997

[54] METHOD AND APPARATUS FOR EMOTIONAL MODULATION OF A HUMAN PERSONALITY WITHIN THE CONTEXT OF AN INTERPERSONAL RELATIONSHIP

[75] Inventors: Kirk Knight, Corte Mandera; John Maccabee, San Francisco; Daniel Sokol, San Jose, all of Calif.

[73] Assignee: All of the Above Inc., Sausalito, Calif.

[21] Appl. No.: 534,636

[22] Filed: Sep. 27, 1995

[51] Int. Cl.$^6$ .............. G09B 19/00; G09B 3/00; G09B 7/00

[52] U.S. Cl. .............. 434/236; 434/322; 434/323

[58] Field of Search .............. 434/236-238

[56] References Cited

U.S. PATENT DOCUMENTS

| | | | |
|---|---|---|---|
| 3,748,750 | 7/1973 | Viemeister | 434/236 |
| 3,960,380 | 6/1976 | Yokoi | |
| 4,305,131 | 12/1981 | Best | |
| 4,569,026 | 2/1986 | Best | |
| 4,766,541 | 8/1988 | Bleich et al. | |
| 5,161,034 | 11/1992 | Klappert | |
| 5,347,306 | 9/1994 | Nitta | 348/15 |

OTHER PUBLICATIONS

Gussin, Lawrence, "The Holographic Medium", CD-ROM Professional, Jul./Aug. 1994, pp. 64–72.
Marts, Boyd, "How Lucky We Are to be Here", Me/dia Magazine, pp. 20–22. Liebman, Hanna, The Big Picture, CD-ROM World, Sep. 1994, pp. 48–53.
Gussin, Lawrence, "Story Games", CD-ROM Professional, Jul./Aug. 1994, pp. 71–76.
Waldrep, Mark, "Quantum Leap", Film & Video, Jul. 1994, pp. 86–90. Crawford, Chris, The False God of Content, New Media, Apr. 1993, p. 18.
"No Emotion", St. Louis Post-Dispatch (Jul. 22,1994), p. 5B An On-Line Discussion Group ar the Whole Earth 'lectronic Link Internet @well.sf.ca.us Interactive Movies in production or released.
Alternate Reality: The City, IntelliCreations Inc., The Software Encyclopedia 1994 V.2 p.1683 Jul 1994.

*Primary Examiner*—Richard J. Apley
*Assistant Examiner*—John Rovnak
*Attorney, Agent, or Firm*—Michael A. Glenn

[57] ABSTRACT

An interactive presentation and/or entertainment system, such as interactive personal computer software and/or interactive television, allows a participant to modulate the emotions of a character or personality, thereby influencing the branches to an interpersonal relationship over time. As a result, a broad range of computerized dramatic situations or stories are presented that closely resemble human interpersonal relationships. Source image/sound data may include prerecorded video, prerecorded audio, computer-based audio, computer-based imagery, computer-generated dialogue, and/or computer-generated characters. The range of emotional choices made by a participant may include all emotions that human beings can experience and, in turn, represent by thought, word, or action. Emotions that indicate personality rather than mood are presented, such that the ebb and flow of a character's emotional states is exhibited over an extended period in the course of a many situations and activities, instead of as mere ephemeral reactions to isolated incidents.

16 Claims, 6 Drawing Sheets

METHOD AND APPARATUS FOR EMOTIONAL MODULATION OF A HUMAN PERSONALITY WITHIN THE CONTEXT OF AN INTERPERSONAL RELATIONSHIP

BACKGROUND OF THE INVENTION

1. Technical Field

The invention relates to branching in personal computer entertainment, computer-based training, computer-based learning, television, interactive television, electric amusement devices, videodisc retrieval, digital generation of animated cartoons, motion pictures, branching in motion pictures, and video games. More particularly, the invention relates to a method and apparatus for emotional modulation of a human personality within the context of an interpersonal relationship.

2. Description of the Prior Art

Prior art devices, such as video games, enable players to control video images of characters by means of buttons, knobs, and control sticks. FIG. 1 is a flow diagram illustrating branching in a traditional story structure. In such structure a viewer is presented with the opportunity to make decisions based upon an inciting incident (100). Such decisions are generally limited to logical choices, such as "pick up the sword (110) and/or the gun (150, 170)," "go through the left door instead of the right," and "shoot the head instead of the arm." While watching a prior art branching movie as described in U.S. Pat. No. 3,960,380, a viewer is provided a simple logical choice: kill or be killed. Many different choices may be presented at any one moment, or a series of choices may be presented to the player during the course of a game. Each logical choice determines which branch the story takes, to the exclusion of other branches. Most often these other branches of the story (120, 140) are literally dead ends where the character dies (130, 160) and/or the game concludes.

Prior art devices have provided logic based story lines, also known as plots (see U.S. Pat. No. 4,305,131). Story lines represent different outcomes based upon logical decisions, and are potentially more involved than a simple choice of kill or be killed. A typical story line might concern a character on a quest for a mate. For example, a male player is given a choice between three women: a brunette, a redhead, and a blonde. By choosing one woman instead of another, the plot line varies to the exclusion of others, and the story might have a different ending.

According to Nolan Bushnell, Atari founder, there are four basic game types:

| Game Type | Objective | Control Input |
|---|---|---|
| arcade | score more | weapon, ball, bat, player |
| strategy | outwit opponent | tactics & strategies |
| puzzle | find solution | correct answer |
| maze | escape | directional movement |

The inventors have observed several interactive story types. Most of these interactive stories are disguised variations on game types:

| Story | Interactivity | Control Input |
|---|---|---|
| action/adventure | defeat opponent | weapons, direction |
| role playing | defeat opponent | weapons, skills |
| random action | have A + B doing C | select A, B, C, go |
| mystery | find solution | correct answer |
| funnel story | choose branch | pick one - return |
| multiple characters | choose point of view | select character |
| multiple plot | choose story plot | pick one outcome |
| multiple dialogue | question, response | pick one response |

Logic choices and plot choices make game play more interesting, but have significant drawbacks when applied to human behavior. In the above example, the story is unchanged if the three women were replaced by three doors among which the character had to choose. Any adult would protest that interpersonal relationships are far more complex than choosing a prospective mate solely on the arbitrary basis of hair color. A key reason is that adults have come to expect that a person takes an action or makes a decision on the basis of motive. This motive can be as simple as to seek or to avoid a feeling, and thus requires a more complex structure than simple logic or plot choices.

More recent computer games have added a transitory mood or feeling, such as anger, fear, humor, or sarcasm to ascribe a momentary attitude to a character. The player may invoke or change this attitude many times throughout the course of the game to steer the character to the desired branch. This mood choice is combined with other attributes to overcome obstacles, such as navigating a maze, solving a puzzle, outwitting an opponent, or deceiving an enemy. Again, if the wrong attitude is chosen for a specific situation, the story branches to an undesirable outcome or a dead end.

FIG. 2 is a flow diagram showing a funnel game structure as is used in state of the art interactive movies. The movie may consist of one or more acts (200, 250). Some of the branches could be dead ends, requiring a return to the prior branching point. Others, for example branch 1 (210) could be literal dead ends, requiring a viewer to return to start (240). The branches may often describe mood swings, such as "anger", "fear", "sarcasm" or "deceit". For example, Branch 2 (220) may be assigned "high anger" and Branch 3 (230) "low anger." In this type of game, the narrative halts until the viewer selects a particular mood, yet both moods eventually flow into the same Act 2 (250). Thereafter, the story continues to branches as in Act 1 along any of several branches (260, 270, 280). Thus, the story outcome is limited and soon predictable despite the viewer's choices.

The range of mood choices in such computer games bears little or no resemblance to human personality types in that the same character can freely exhibit any mood deemed desirable by the player. Choice of emotional mood is reduced to a logical strategy decision equivalent to choosing, for example, a knife instead of a sword.

The advantages of the prior art techniques are that they provide many hours of interactive entertainment without obvious repetition. By definition, the moods expressed by the character were transitory, and bear no consequence on what can be expressed in the same or similar situation, so the situation can be reentered numerous times without repeating the same mood choice. The drawback is that the characters are so emotionally limited as to more closely resemble automatons rather than human beings. This is a key reason why most interactive games are based upon a limited range of story genres: fantasy, gothic horror, action-adventure, combat, target practice, or quest. These types of stories depend upon protagonists with emotional limitations that are understandable by adolescents and juveniles. Adults are not so easily satisfied by the same limitations.

A key advantage of the prior art techniques is that the mood choices are nearly instantaneous. Selecting anger enables a character instantly to escalate a situation with violence. Selecting fear enables a character instantly to flee a situation. While such instantaneous choices are well suited to the kind of fast-paced game play typical of video games, such instantaneous emotional shifts are unnatural. In fact, game designers constantly strive for faster instinctive response rather than thoughtful pondering of choices. Again, adults find such choices, when applied to human characters, unsatisfying representations.

Another drawback of prior art techniques is that they are poorly suited for modeling human emotional ranges. Logical control devices, such as buttons and control sticks, are designed for making immediate input commands, not for suggesting subtle emotional states which ebb and flow gradually. Many of the prior art mood choices noted above are instantly achieved at the press of a button, again, not indicative of natural human patterns. A related drawback of prior art techniques is that the input device presumes a logically proportional relationship between the number of choices and the positions of a control device. A computer control with 10 settings suggests that the difference from 1 to 2 is the proportional to the difference from 7 to 8. Human patterns are far more subtle, indistinct, and context-sensitive.

Another drawback of prior art techniques is that they interrupt the state of passive viewing by stopping the action and awaiting user input. Such states are a part of the master/slave paradigm where the user is master and the machine is the slave awaiting commands. The drawback of this paradigm, when applied to emotions, interrupts what is called "the suspension of disbelief," or the viewer's willing desire to believe that what is seen is real and ignore the reality of watching photons moving on a display representing an actor portraying a fictional character. By successfully suspending disbelief in the audience, the storyteller is able to convey more artfully a rich sense of emotional depth to the characters in the story.

A related drawback of prior art techniques is that they overlook one of the fundamental components of human emotion, i.e. surprise. By making choices based upon logic, prior art techniques require the storyteller to follow a path to a logical outcome that can be inferred by the viewer. If the outcome is known, the element of surprise is taken away, and the viewer usually finds the story less compelling. It is for this reason that people scoff at the notion of changing the ending to movies. Changing the ending to Hamlet, without changing Hamlet, is not going to make Hamlet more compelling.

SUMMARY OF THE INVENTION

This invention provides a system that enables the representation of human interpersonal relationships heretofore not provided by any prior art system. With the invention one or more people can participate in a motion picture, television, audio, or a computer-based or computer-generated story by ascribing emotional characteristics to a character or characters in the course of a narrative, thus embodying the character's personality. The consequences of such participation are that the character takes on the defined personality characteristics in an interpersonal relationship presented in the form of motion picture images, television images, computer-based images, or computer-generated images.

The system can be scaled from short simulations to very long depiction of interpersonal relationships, and can be implemented with many types of presentation methods, such as motion pictures, videotape, television, videodisc, computer-based images, computer-generated images, interactive television, and branching motion pictures.

It is also easy to implement much of the system in audio because the files are smaller, easier to model, and easier to edit. Thus, an interpersonal relationship may be presented aurally, with user interaction determining progression of a narrative. In this particular implementation of the invention, the system may be used in an automobile, e.g. by providing appropriate voice recognition algorithms for entering user interaction; or the system may be implemented in a portable, dedicated unit for mobile environments, such as during travel.

The system enables the representation of human interpersonal relationships in fields as diverse as entertainment, psychology, training, evaluation, counseling, and therapy and, when applied to existing linear stories, produces new interactive stories that are related to the original story, yet are unique.

The invention implements such system based on a critical distinction between logic and emotion, as applied to computers, computer-based training devices, and interactive television. The system is also based on a key distinction between an instantaneous branch and a gradual branch. The system eliminates the requirement that the viewer make a choice for the story to continue by taking into account the desire of the viewer for an uninterrupted story flow, or "suspension of disbelief." The system may also include a weighted slider interface that permits a viewer to select a programmable algorithm and thereby determine which branch within a narrative to follow.

In one embodiment of the invention, viewers in different locations, yet connected to the same presentation system, may each modulate the personality parameters of a different character and thereby produce a composite personality; or each viewer may modulate a different character, thereby producing broad range of unique character interactions.

Other embodiments of the invention permit individuals to experience strategies and tactics for handling work-related personality differences safely, i.e. without confrontation and conflict, by using widely researched personality inventories as a factual basis for selection. Typical interpersonal work-relationships include customer and sales person, team leader and team member, supervisor and subordinate, employer and prospective employee. Related to this embodiment of the invention, an individual seeking to improve work-related communication skills could safely experience strategies and tactics for handling personality differences with the same personality inventory.

Related embodiments of the invention permit psychotherapy students, patients and practitioners to experience safely other emotional choices reflecting different personality types; and permit self-selection of personality inventory tests for the purposes of personal awareness, personal development, or improved mental health. Yet other embodiments of the invention permit self-selection of personal coping strategies in interpersonal relationships. Such embodiments are helpful for individuals in personal crisis, such as spousal abuse or homelessness; or as a therapeutic prevention in anticipation of personal crisis by viewers, such as runaway youth, sexually active adolescents, alcohol abusers, illicit drug users, sexual partners of drug users, smoking juveniles, delinquents, or petty criminals. Related to this embodiment of the invention, many types of self-help processes can be created to assist the development of emotional, professional, or spiritual skills and insight of the viewer. Such embodiments are useful for weight reduction, stress management, marriage counseling, career counseling, parenting skills, self-esteem training, and stress reduction.

DETAILED DESCRIPTION OF THE INVENTION

Figure 1:
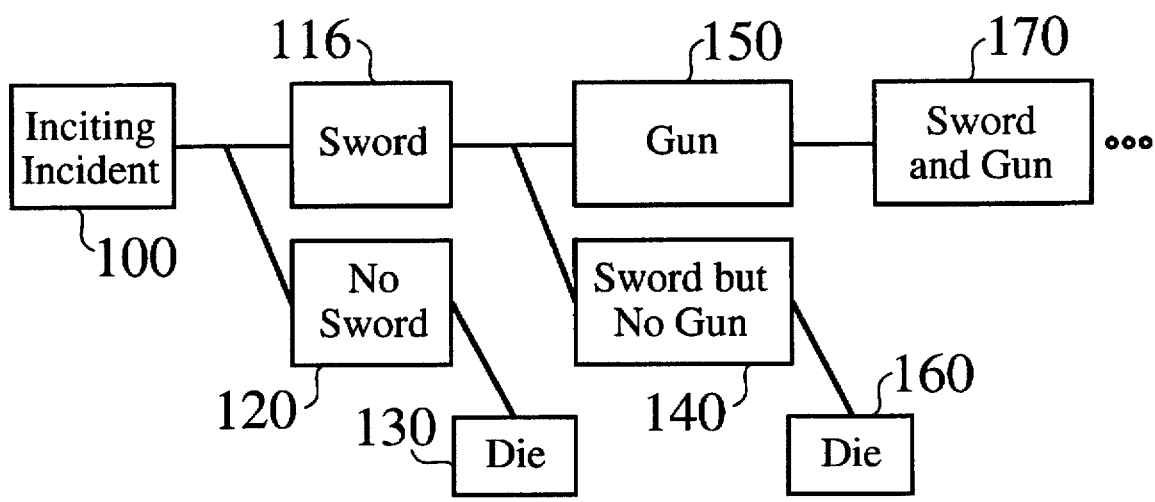
FIG. 1 is a flow diagram illustrating branching in a traditional story structure.
Figure 2:
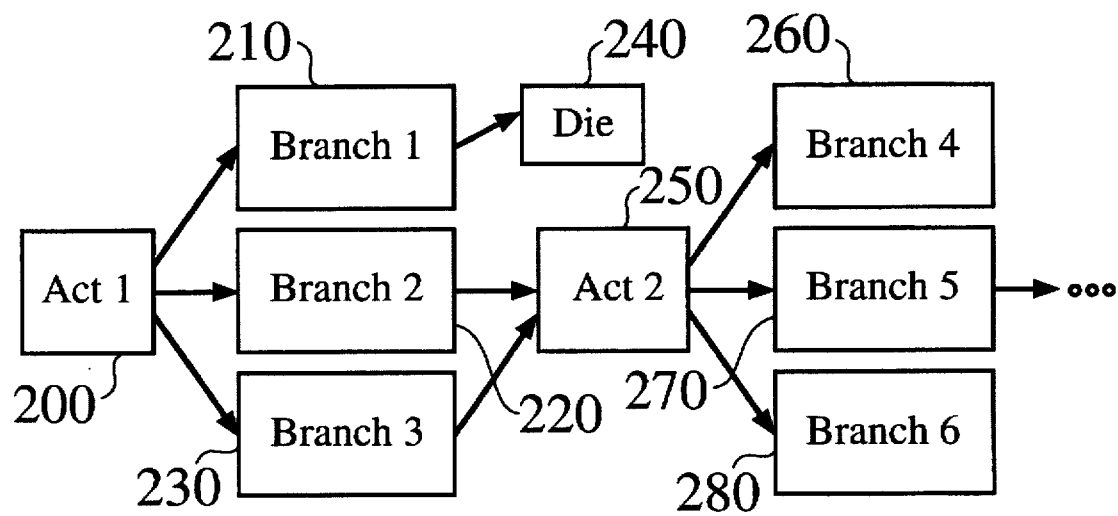
FIG. 2 is a flow diagram showing a funnel game structure as is used in state of the art interactive movies.

The invention relates to interactive presentation or entertainment systems, such as interactive personal computer software or interactive television, as a process and computer software interface method thereof that makes it possible to modulate the emotions of a character or personality, and thereby influence the branches to a dramatic situation over time. The invention provides a system that makes it possible to create a broad range of computerized dramatic situations or stories that more closely resemble human interpersonal relationships than processes and software interface techniques that rely merely upon logical choices. The input image and audio data for such dramatic situations may take the form of prerecorded video, computer-based imagery, or computer-generated characters. The range of emotional choices include all emotions that human beings can experience and, in turn, represent by thought, word, or action. Significantly, the system relates to the kinds of emotions that indicate personality rather than mood, i.e. emotional states which are exhibited for an extended period in the course of a many situations and activities, rather than feelings which come and go in minutes.

The system may be implemented as an apparatus that reads an optical videodisc containing independently addressable video frames, blocks of compressed audio, and/or animated cartoon graphics for the multiple story lines which the narrative may take (for such systems as are known to those in the art, see U.S. Pat. No. 4,305,131, which is incorporated herein by reference). In one embodiment of the system, a record retrieval circuit reads blocks of binary-coded control information comprising a branching structure of digital points that specify precisely which video frames, cartoon frames, and/or portions of audio are to be presented at any instant of time. The apparatus can thus provide each viewer with an illusion of individualized and active participation in a motion picture.

It is also easy to implement much of the system in audio because the files are smaller, easier to model, and easier to edit. Thus, an interpersonal relationship may be presented aurally, with user interaction determining progression of a narrative. In this particular implementation of the invention, the system may be used in an automobile, e.g. by providing appropriate voice recognition algorithms for entering user interaction; or the system may be implemented in a portable, dedicated unit for mobile environments, such as during travel. Thus, source material may be provided in the form of audio transcriptions, tape recordings, computer-based audio, and computer-generated audio.

Another embodiment of the system herein may also make use of techniques disclosed in U.S. Pat. No. 4,569,026, which is incorporated herein by reference, in that it can present the viewer with two or more alternatives to choose among, or the opportunity to change the course of the action or dialogue. Once the viewer has made a selection, the system addresses the appropriate audio and video frames on a random-access videodisc or other data storage device. As disclosed in U.S. Pat. No. 3,960,380, which is incorporated herein by reference, the system herein may provide a branching movie.

Yet another embodiment of the system herein provides controlled frame-by-frame track skipping that permits the instantaneous real-time selection between a wide variety of video segments (see, for example U.S. Pat. No. 4,766,541, which is incorporated herein by reference). These video segments are assembled using similar techniques as are used for traditional movie production, where images are juxtaposed with others to tell a story.

One feature of the system enables a user, while viewing a music video or movie, to be presented with a menu specifying choices which the user may make, wherein the next program placed is an item from the menu selected by the user. A branch table is encoded within what is known as a subcode channel of a laser video disc. The table is loaded into a memory and specifies information that identifies segments on the laser video disk to which the playback head of the laser video disc should go when a particular control button is pressed (see, for example U.S. Pat. No. 5,161,034, which is incorporated herein by reference).

However, unlike the above described prior art systems which are useful to provide those skilled in the art with a hardware/software framework from which the system herein disclosed may be constructed, the invention is based at least in part upon a key distinction between the use of emotion and logic. Thus, one feature of the invention takes a protagonist or other character (or characters) in an existing story and develops an alternate story that flows naturally from the emotional choices made for the protagonist by a viewer, where the story has an outcome that could not be inferred by the viewer.

For example, using prior art techniques, a viewer of Shakespeare's Hamlet could be provided with several ways in which to interact with the story. The viewer may control the movement of Hamlet as he wanders around the kingdom gathering clues to implicate his father's murderer; or the viewer could choose different weapons for Hamlet's duel, putting down the broadsword and taking up the mace; or the viewer could choose another love interest for Hamlet than Ophelia, perhaps one who would seduce him into leaving the kingdom rather than leaving for a nunnery; or the viewer could choose different moods, perhaps becoming angry at the Queen to scare the adulteress away, or using deception to trick the new King into a fatal mistake.

Each of the above described prior art techniques leads to a compelling game for adolescents, but none would result in a compelling story for adults.

Figure 3:
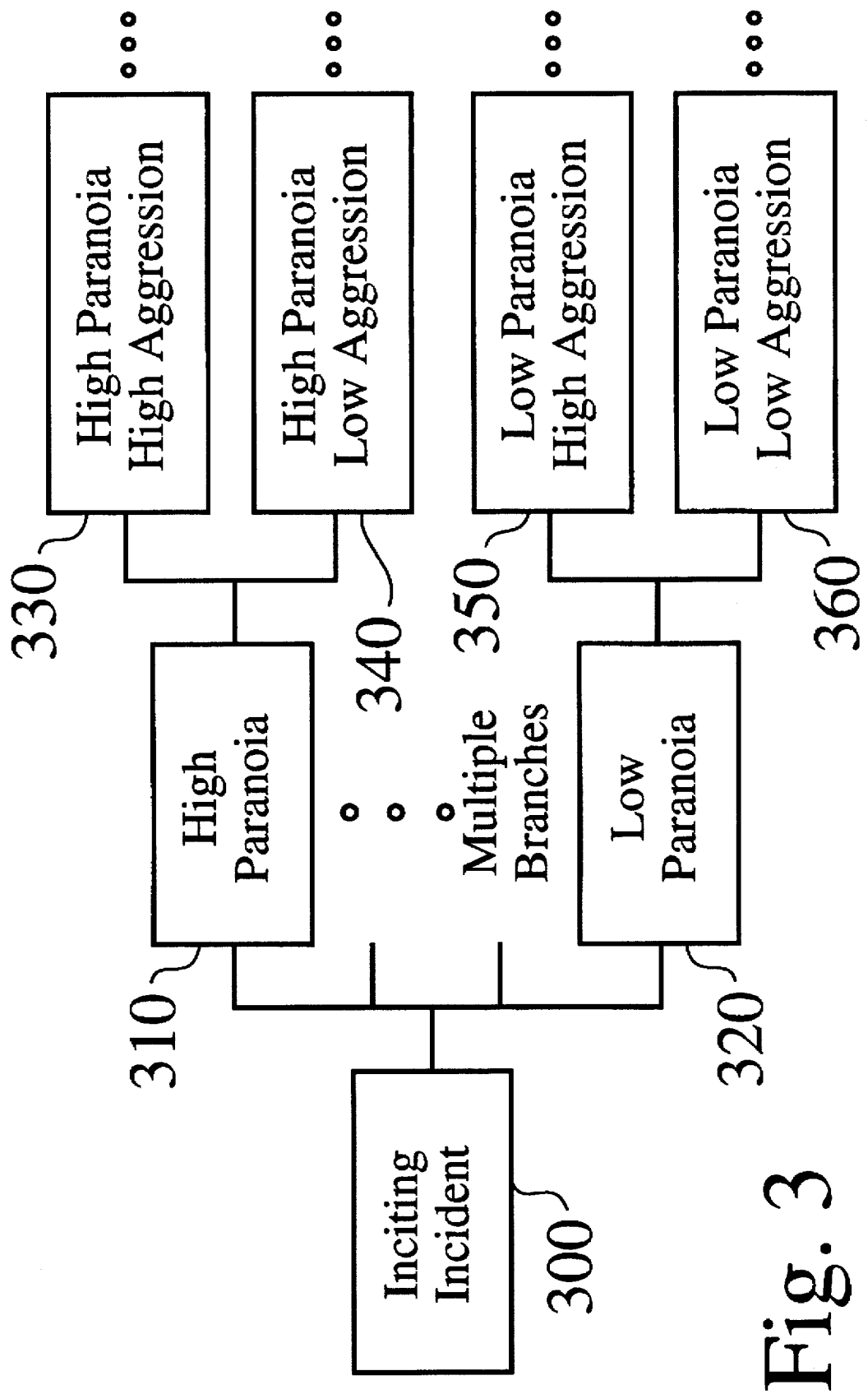
FIG. 3 is a flow diagram showing a story having an emotional branching structure according to the invention.

FIG. 3 is a flow diagram showing a story having an emotional branching structure according to the invention. Employing the invention, Hamlet's story is diagrammed such that, at the beginning of the story, there is an inciting incident (300): e.g. the death of Hamlet's father. The viewer is presented with a single emotional choice, in this example paranoia, for Hamlet's personality, which is modulated by the viewer for a high or low setting (310, 320). Such modulation may be digital, i.e. either high or low, or it may be analog, i.e. anywhere between the extremes of high and low. Viewer modulation, in turn, selects personality traits related to the level of paranoia chosen. If Hamlet has high paranoia, he is always the sort of person who fears for his own life, and is suspicious of others. If he has low paranoia, he does not fear for his life, nor is he as suspicious. Hamlet can then have a series of encounters with the characters from the Shakespeare original. Through these interactions the viewer can see how the single emotional choice of paranoia has continuing repercussions in Hamlet's reactions to his encounter with his father's ghost, as well as other characters. It will be appreciated by those skilled in the art that the actual choice of emotion may be more complex than that of the example above, i.e. it may involve developing a complex personality profile, discussed below.

The invention is preferably implemented as a library of labeled source materials, e.g. alternate scenes from Hamlet, each of which is addressed in accordance with a unique tag. By selecting personality traits, for example at a display, the viewer in effect programs a sequence of scenes under control of a software engine that instantaneously presents such scenes in a unique order which corresponds to a narrative that is consistent with the viewer-selected personality traits. Given the high speed of personal computers and the relative low cost of storage media, the system herein described may be used to catalog a large number of alternate scenes of various length, the order and use of which is a function of one or more character's personality, as selected by the viewer. Thus, such scenes may be used, if at all, in any sequence that is consistent with a narrative developed around a character having the selected personality. In this way, the system provides an extensive -number of narrative sequences based upon viewer choices.

In the example of Hamlet above, the next emotional choice can be aggression. The high paranoia Hamlet, already fearing for his life, if also aggressive (330), might act too hastily to attack his father's murderer. This same Hamlet, with low aggression (340), might build his alliances until he had the necessary strength to confront the murderer. The low paranoia Hamlet, with high aggression (350), would not fear for his life and might confront his mother, the Queen to seek an alliance with her. The low paranoia Hamlet, with low aggression (360), might spend more time preoccupied with his friends or Ophelia, oblivious to potential danger and perhaps just happy to be alive.

With the invention, simple emotional choices made by a viewer at the beginning of a narrative resonate through a character's life. In this way, not only does the ending change, but the way the story unfolds changes in new and surprising ways. This presents the storyteller and the viewer with the opportunity to guide the story, yet provide for the unexpected elements which are part of the storytellers' art. Therefore, the invention provides an effective method for translating traditional linear stories into interactive forms for presentation with CD-ROM, videodisk, interactive television, or computer-generated imagery.

The invention provides a system that can also be combined with such prior art techniques as mood modifiers, plot changes, or logical choices to make more complex characters or stories. The invention does not restrict the implementation of such prior art inventions in any way. The invention also applies to other portrayals of human interpersonal relationships such as training, education, psychological health, self-awareness, self-discovery, role playing and simulation. When applied to these areas, the invention can be operated to present personalities that exhibit widely differing emotional preferences to the same situations.

One use for the invention in computer-based role playing involves instructing a supervisor in how to work best with a subordinate. The supervisor uses a set of personality choices to model the type of behavior exhibited by a subordinate. A separate set of personality choices is then used to model the kinds of emotional strategies the supervisor can employ to achieve a desired result. Such personality choices may rely upon widely researched personality inventories, such as the Jungian psychology-based Myers Briggs Type Inventory or the Strong Inventory.

Another user of the invention in computer-based role playing involves instructing a sales person in selling techniques for many different customer types and situations. The sales person or sales manager can use a set of personality choices to model the kind of customer, then view the suggested techniques and approaches for satisfying that customer's emotional needs.

Another use of the invention is for personality evaluations using thoroughly researched personality typology systems such as Enneagrams. Personality evaluations, such as the Personality Disorder Examination, are useful for making a distinction between pathological and non-pathological personality disorders. Such a system could also assist students in learning how to make such distinctions. A related use of the invention with the same typology material could result in a less rigorous self-examination such as the Personality Self-Portrait (see J. Oldham, M. D. and L. Morris, *The Personality Self-Portrait, Why you think, work, love, and act the way you do*, Bantam Books 1990, ISBN0-553 -05757-X) designed for understanding personality styles rather than personality disorders.

Figure 4:
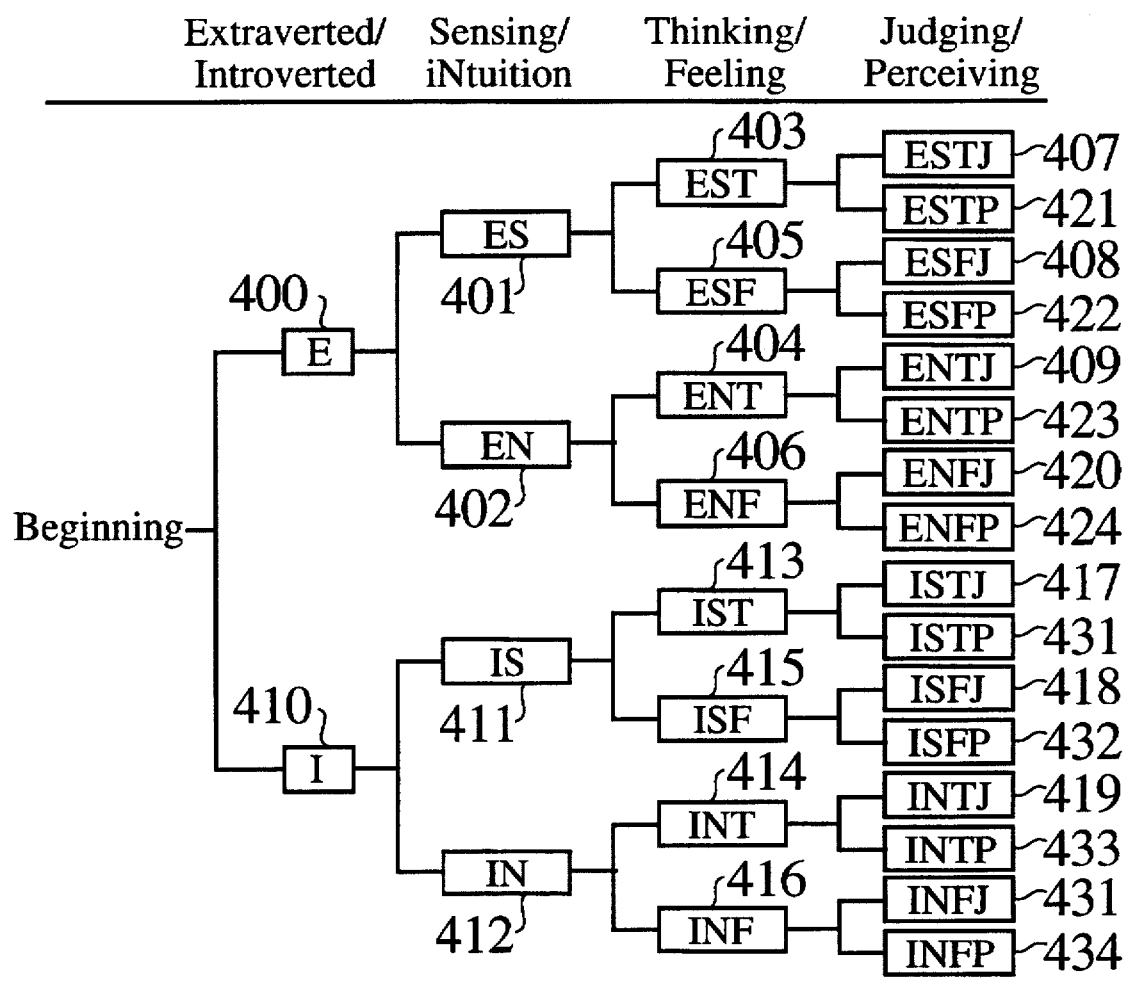
FIG. 4 is a flow diagram showing a personality type branching structure employing a Myers-Briggs type inventory.

FIG. 4 is a flow diagram showing a personality type branching structure employing a Myers-Briggs type inventory (see I. Briggs Myers, P. Briggs Myers, *Gifts Differing*, Consulting Psychologist Press, Inc. (1980, 1993)). Using a Myers Briggs Type Indicator, the first personality choice could be the choice between Extraversion (400) and Intraversion (410). The next personality choice would be a choice between Sensing (401; 411) and intuition (402; 412). The third personality choice would be between a preference for Thinking (403, 404; 413, 414) and Feeling (405, 406; 415, 416). Finally, a fourth choice would be between a Judging (407, 408, 409, 420; 417, 418, 419, 430) or Perceiving (421, 422, 423, 424; 431, 432, 433, 434) personality. The result of these four choices is to direct the viewer to one of the complex sixteen Myers Briggs personality types.

For example, in the course of a narrative, the viewer may be presented a series of choices which represent how the viewer feels. The computer tracks the range of viewer response and when these feelings occur, describe personality characteristics, based upon the viewer's responses, a narrative is assembled in which one or more characters have a specific personality trait which reflects the feelings of the viewer. One use of this feature of the invention allows a viewer to describe a personality trait of themselves or another person in their life through a process of emotional reduction. In the course of the narrative sequence, the viewer responds within a range of affirmation or negation to the emotions posed in the narrative. The computer tracks the range of viewer response and when these feelings occur. As a result, a narrative sequence is assembled that presents a character having personality traits most nearly matching those of the individual in question.

Other applications of the invention include a similar approach for a couple in marriage counseling, simulating life choices for a sexually active teenager, simulation of sexual harassment in the workplace for both parties, and simulation of emotional choices for spouses in abusive relationships. Many emotionally complex interpersonal situations can be modeled or simulated using the invention, with a range of possible outcomes.

Figure 5:
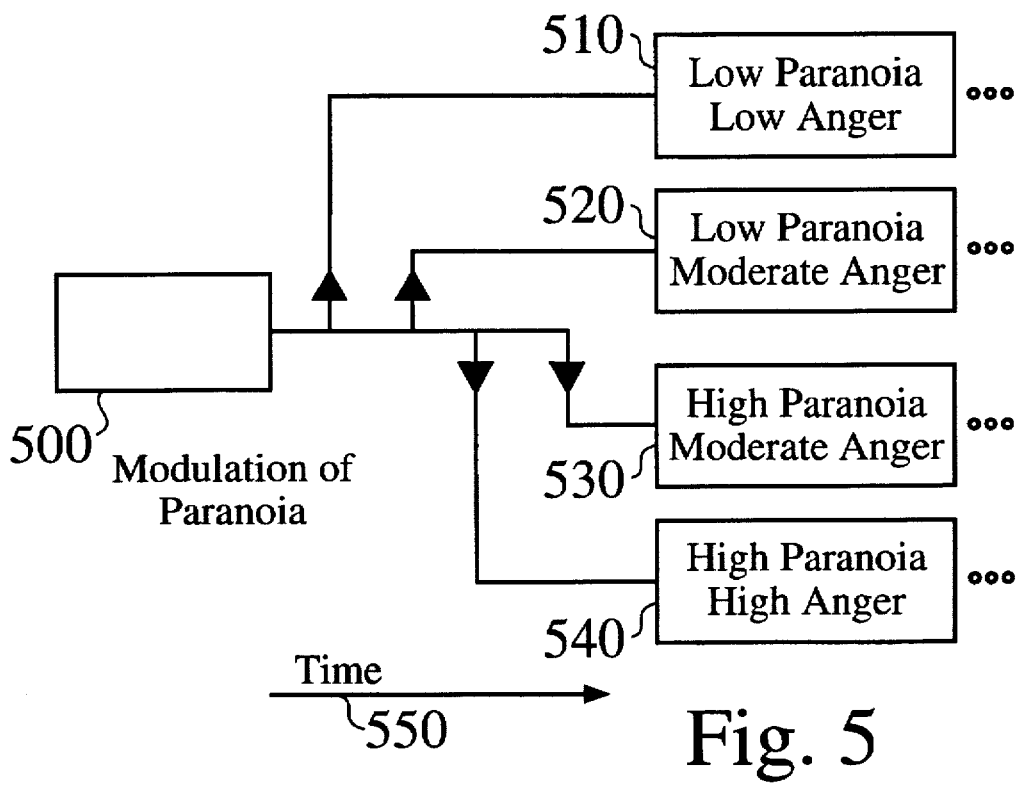
FIG. 5 is a flow diagram showing gradual branching according to the invention.

The invention is also unique in that it provides a technique that distinguishes between an instantaneous branch and a gradual branch. Prior art techniques are intended to make nearly instantaneous changes. FIG. 5 is a flow diagram showing gradual branching according to the invention which shows how the gradual branching method, when applied to transitory feelings and emotional choices results in change over time duration of seconds or even minutes. The inciting incident (500) permits the viewer to choose to modulate paranoia. For example, the inciting incident might have a feeling that is exhibited as increasing anger. Through the choice of the viewer, the point at which the story branches is different for each of the subsequent branches. For example, the viewer may choose a low paranoia branch in which either low anger (510) is exhibited, or in which moderate anger (520) is exhibited; or the viewer may choose a high paranoia branch in which moderate anger (530) is exhibited, or in which high anger (540) is exhibited. Some personality types, such as low paranoia, could be less likely to exhibit anger than highly paranoia types. Therefore, the branch points for the high paranoia choices might be several seconds or even minutes later as the character increases a display of anger. This effect is shown by the time line (550).

The invention also implements a unique technique that makes a critical distinction between logic and emotion as applied to computers, computer-based training devices, and interactive television. This novel technique eliminates the requirement for the viewer to make a choice for the story to continue by taking into account the desire of the viewer for an uninterrupted story flow, or "suspension of disbelief." When a choice is presented, the viewer may choose to make no choice, whereupon the computer program makes the choice without interrupting the story flow. This choice may be preprogrammed to a set of fixed responses or may be the result of a random choice instituted by the computer. Additionally, such choice would be consistent with the character's personality, i.e. the narrative would present each actor "in character."

Figure 6:
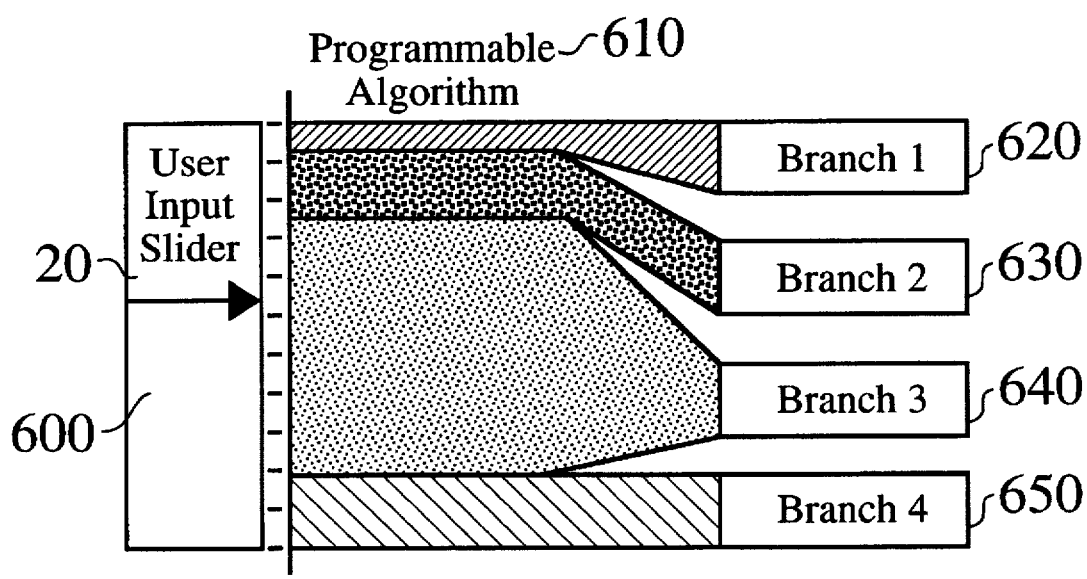
FIG. 6 is a block flow diagram showing a weighted slider interface for a branching structure according to the invention.

The invention also includes a unique weighted slider interface that permits a programmable algorithm, such as a bell curve, to be used to determine which branch to follow. FIG. 6 is a block flow diagram showing a weighted slider interface (600) for a branching structure according to the invention. The use of a programmable algorithm (610) provides a means of more closely modeling the branches (620, 630, 640, 650) to a human emotional range where extremes are rarely exhibited.

Certain personality types tend to view the world as black and white, all or nothing extremes, using a 1–10 scale is either 1 or 10. Other personality types are more likely to moderate their choices to avoid the extremes. Their choices rarely venture beyond the midpoint, generally falling between 3 and 7. A programmable algorithm can thus be based upon the choices which came before. Thus, the algorithm can be adjusted in the course of the narrative to take into account different viewer personality types. In the above example, the threshold for distinctions for the moderate personality would be reduced, i.e. a movement of one unit may be enough to change branches, while the threshold for distinctions for the extreme personality would be expanded, i.e. a movement of five units would be necessary to change branches. Thus, a branch may be based upon a previous personality selection. The slider suggests many subtle gradations of choice, whereas a switch suggests only two choices.

The algorithm also provides a distinction from prior art methods which expect a logically proportional relationship between the number of choices and the positions of a control device. If the control were to indicate a scale of one to ten with ten settings, the viewer might reasonably expect ten different branches. By employing a slider 20 with a very wide range of settings and no scale, the viewer infers that much more subtle adjustments are required. It is only through repeated viewed experiences that the viewer can come to learn the subtlety or "courseness" of the settings.

Figure 7:
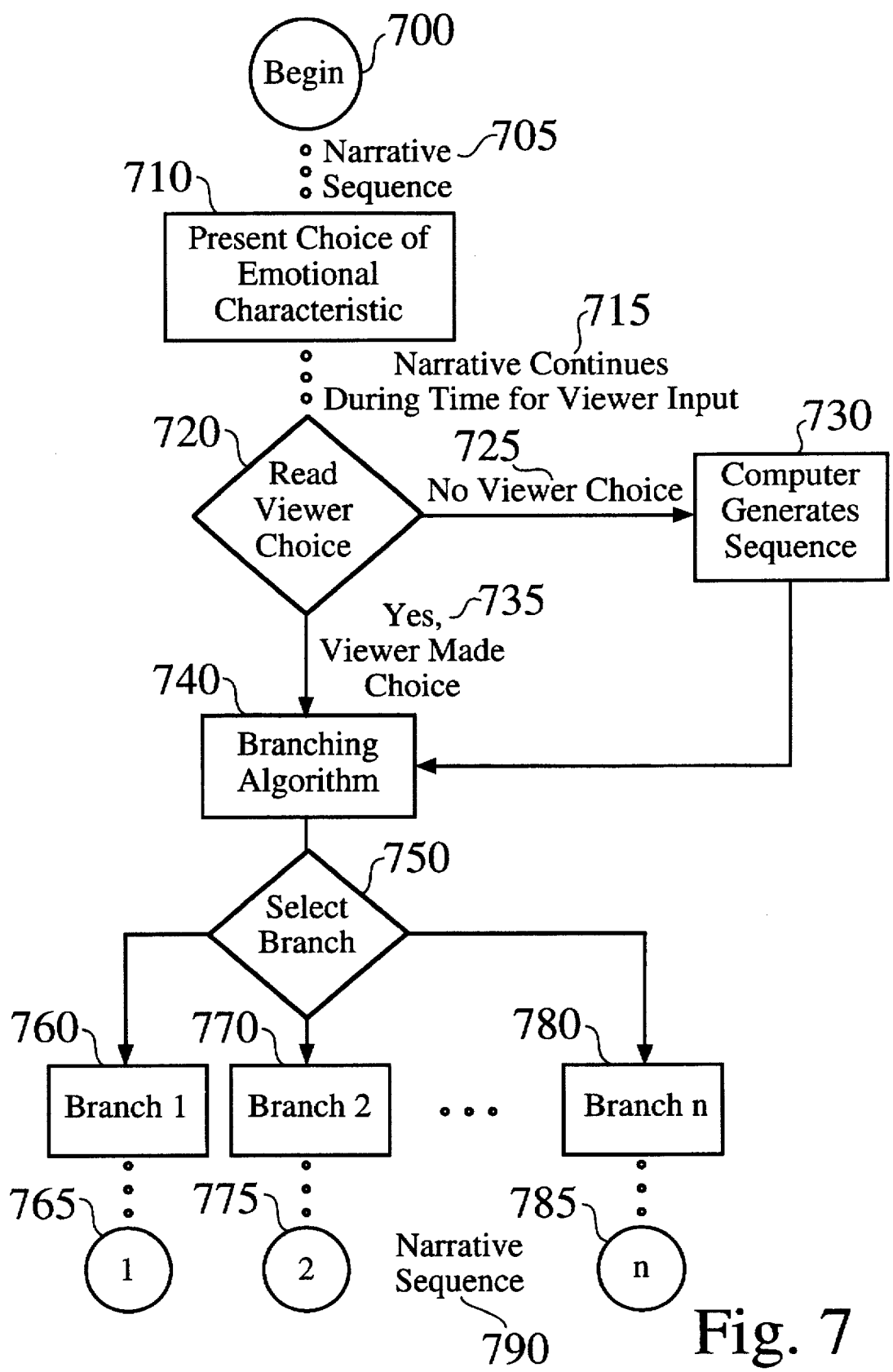
FIG. 7 is a flow diagram showing selection of emotional characteristics according to the invention.

FIG. 7 is a flow diagram showing selection of emotional characteristics according to the invention. In the figure, selection begins (700) at the beginning of a narrative sequence (705) that continues during the selection process (715, 790). A choice of emotional characteristics is presented (710) and the system reads the viewer choice (720). If no choice is made by the viewer (725), the system randomly generates a choice (730). If the viewer makes a choice (735), the system enters a branching algorithm (740) that selects a branch (750) in the narrative in accordance with the viewer's selection. Any of several branches (760, 770, 780) may be selected, thereby producing any of several possible corresponding narrative sequences (765, 775, 785).

Figure 8:
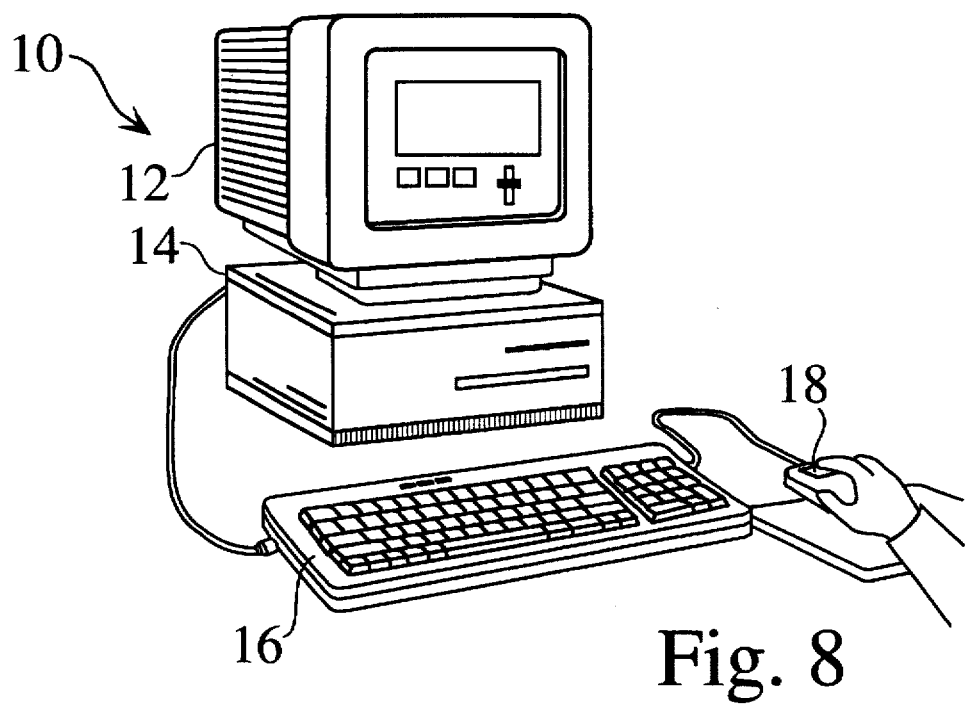
FIG. 8 is a perspective view of a computer implementation of the invention.

FIG. 8 is a perspective view of a computer implementation of the invention. The system, when implemented in a personal computer 10 includes a CPU 14 having an internal hard drive, CD-ROM drive, and audio capability; a "display 12", a keyboard 16, and a pointing device, such as a mouse 18. It will be appreciated by those skilled in the art that the actual hardware implementation of the system is a matter of choice. Thus, the system may be implemented in a dedicated unit and, if desired, may dispense with the monitor, thereby providing an audio only system. Similarly, the system may be distributed across a network from a server, or may be provided by an on-line service, for example over the Internet.

Figure 9:
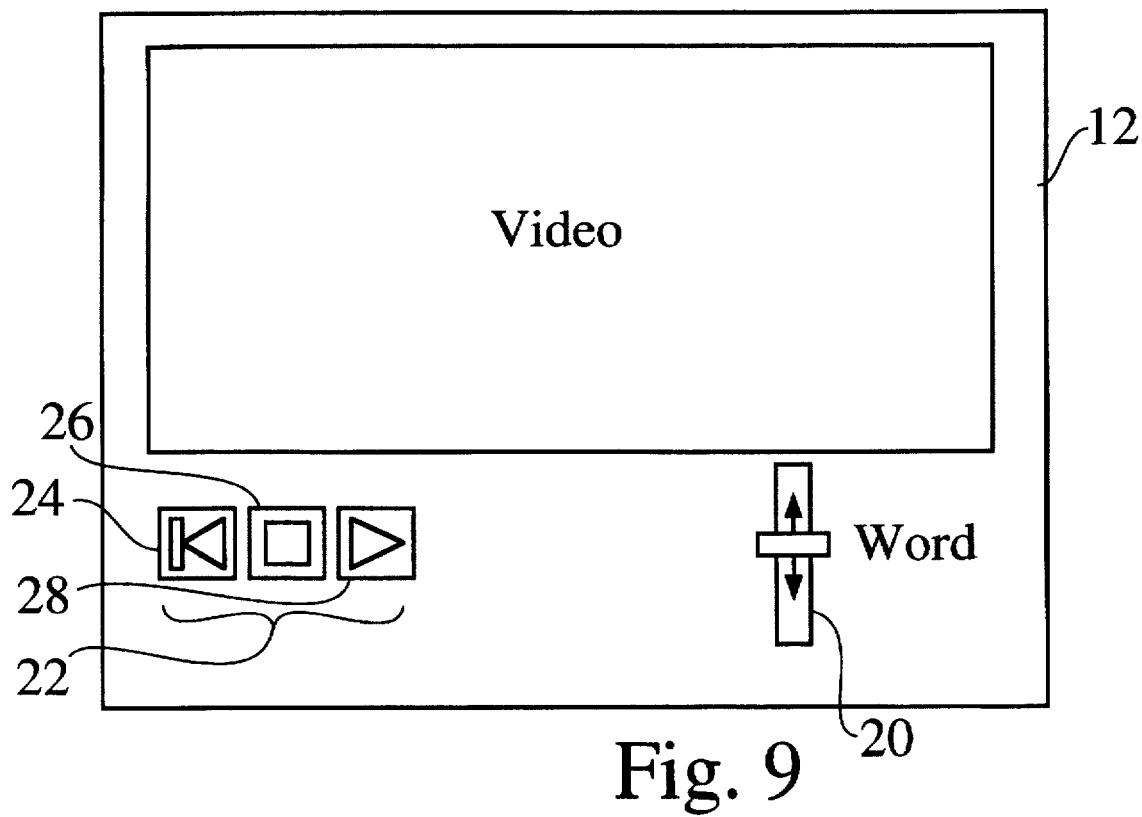
FIG. 9 is a view of a computer display according to the invention.

FIG. 9 is a view of a computer display according to the invention. In the figure, the monitor 12 includes a built-in or soft display transport control 22 that includes a play/forward "button 28", a stop button 26, and a rewind to last branch/ rewind to start button 24. The slider control 20 navigates through a list of words that define the emotional characteristic desired (see below). The emotional characteristic may be selected from a large list of such words, such that subtle shades of emotion are used to color progression of interpersonal relationships during the course of the narrative. Furthermore, the slider may provide both a selection function, and a degree function, e.g. denoting more or less of a characteristic associated with the word, or affinity with or aversion to a particular emotion associated with the word.

Range of Story Genres

The invention is highly versatile, and therefore may be applied to the construction of many different story genres by making changes to the personality characteristic to be modulated by the viewer. Such genres are readily programmed into a typical computer system that implements the invention by those skilled in the art. For example, such story genres may include at least any of the following, either alone or in combination:

Melodrama. The personality choices involve interpersonal emotions that affect how the protagonist relates to other people. Typical personality choices include paranoia, aggression, lust, compassion, altruism, envy, jealousy, and greed.

Political Thriller. The personality choices involve political calibrations, such as liberal or conservative, moderate or extremist, idealistic or cynical, self-serving or altruistic.

Gothic Horror. The personality choices concern the fears of the protagonist, such as spiders or snakes, dark or light, agoraphobia or claustrophobia, heights or caves. The objective is to present what most scares the viewer.

Mystery. This structure requires mostly logical choices to solve the puzzle of the mystery. However, the personality of the protagonist, usually a detective, can be modulated to yield different responses from different suspects, informants, and witnesses.

Comedy. This structure demands unnatural human personality representations for greatest humor. The personality choices involve excessive personality characteristics in the protagonist. It is also amusing to assemble a protagonist with mismatched personality characteristics, for example an absentminded compulsive who can't remember what he's obsessed about at any given moment.

Romance. The viewer adjusts the protagonist's personality as the protagonist attempts to have a satisfying interpersonal relationship.

Action Adventure. Action Adventure requires the protagonist, e.g. a hero, to do the right thing at all times. This personality type allows little fundamental modulation and is nearly always identical: action oriented, courageous, assertive, and confident. Therefore, the sidekick is the personality to modulate. The sidekick has a penchant for doing the right thing for the wrong reasons, or the wrong thing for the right reasons, which complicates the story for the hero.

Fantasy. As ruler of a kingdom, the protagonist must find a balance between his own desires and those of civilization.

Science Fiction. The viewer creates new life forms through combinations of personality characteristics. Some of these life forms can successfully survive for generations, others are self-destructive or overly aggressive, others have so little life force that they literally die out.

One embodiment of the invention allows the selection of a character's personality based upon emotional traits of the character. Thus, it is important to provide a wide range of descriptive terms to allow the personality of the character to have sufficient depth, such that the viewer takes an interest in the character. The following appendices provide a partial list of terms that are useful as choices to provide a viewer when one implements the invention.

By using the slider control 20 to denote an affinity or aversion to a specific word or phrase, especially a word or phrase which describes an emotion, describes a feeling, or is an emotion-laden word or phrase, a viewer could use these words to develop a complex personality type for the character. In some applications where the viewer is preliterate or illiterate, or where a visual image can convey the same or similar objective as the above noted words and phrase, a visual image such as an icon or pictograph may replace the word. The principle objective is to assist the viewer in making distinctions which can be denoted as affirming or denying that feeling.

Appendix 1: Emotion-Laden Words

The following list of emotion-laden words is selected from J. de Rivera, *A Structural Theory of the Emotions*, pp. 156–164 Hartvig Dahl and Joseph deRivera, International Universities Press, Inc. 315 Fifth Avenue New York, N.Y. 10016 1978. By using the slider control to denote an affinity or aversion to an emotion-laden word, a viewer could use these words to develop a complex personality type for the character.

| abhorrence | accepting | admiration | affection |
|---|---|---|---|
| afraid | alarmed | amazed | ambitious |
| amused | angry | anguish | annoyed |
| anxious | apathetic | apprehensive | approval |
| ashamed | astonished | an aversion | awe |
| benevolent | blasé | bored | cheerful |
| complacent | confident | contemptuous | contented |
| courageous | craving | curious | defeated |
| dejected | delighted | depressed | desirous |
| despair | despondent | determined | devoted |
| dignified | disagreeable | disappointed | disbelief |
| discontented | disgusted | dislike | dismayed |
| distracted | distressed | doubt | dread |
| eager | ecstatic | elated | embarrassed |
| enjoyment | enthusiastic | envious | exasperated |
| excited | expectant | exultant | fear |
| free | friendly | frightened | frolicsome |
| frustrated | furious | gay | grateful |
| gratified | grief | guilty | happy |
| hate | helpless | horrified | hopeful |
| humble | humiliated | impatient | inclined |
| indignant | inferior | inspired | interested |
| irritated | isolated | jealous | joyful |
| liking | loathing | lonely | love |
| ludicrous | lustful | malicious | meek |
| melancholy | modest | moral | mortified |
| nauseated | nervous | nostalgic | oppressed |
| pain | panicked | passion | patient |
| pensive | perplexed | pity | pleased |
| powerful | pride | protective | rage |
| rapture | regretful | relief | remorse |
| repentance | resentful | resigned | respect |
| restrained | reverence | sad | satisfied |
| scornful | serene | shame | skeptical |
| sorrowful | startled | strange | successful |
| superior | surprised | suspicious | sympathetic |
| tender | terror | thankful | timid |
| triumphant | vain | vexed | virtuous |
| weak | willful | wonder | worried |

Appendix 2: Words Representing Feelings

The following list provides words that represent human feelings. By using the slider control to denote an affinity or aversion to a feeling, a viewer could use these words to develop a complex personality type for the character. (Source: *American Heritage Electronic Dictionary Third Edition*, published by Houghton Mifflin, copyright 1992.

| abhorrence | absent | affect | affection |
|---|---|---|---|
| affinity | afterglow | aftertaste | aggrieved |
| anger | angry | angst | animus |
| ardipathy | apathy | ardent | ardor |

| | | | |
|---|---|---|---|
| arid | ashamed | association | attack |
| attitude | averse | aversion | blunt |
| boot | breathe | brittle | butterfly |
| caring | chagrin | charge | cheerful |
| chilly | chord | cold | cold-blooded |
| cold-hearted | comedown | comfort | compassionate |
| complacency | concert | confidence | contemptuous |
| contrite | cord | dead | deep |
| depression | devoted | disdain | dislike |
| dissatisfaction | dissent | drunk | dubiety |
| effusion | elevation | emotion | envious |
| envy | euphoria | excite | expression |
| fear | fearful | feeling | fire |
| fish | flush | frigid | gall |
| gloat | glow | grievance | grudge |
| halfhearted | harangue | harbor | hardhearted |
| harmonious | harmony | heart | heartless |
| heebie-jeebies | home | homey | horror |
| hostile | hopelessness | despair | how |
| hunch | hurt | ill will | impression |
| impulse | indifferent | inflame | inspiration |
| jot | joy | joyful | joyous |
| jubilation | karma | kick | knot |
| lament | lassitude | liking | love |
| loving | lump | mad | malaise |
| malignity | man | materialism | matter |
| melt | misgiving | mollify | mournful |
| nausea | nervous | nicety | nuance |
| obdurate | object | obligation | obsession |
| owe | pang | passionless | pathos |
| pathetic | patriotic | penitent | phallic |
| pique | pleasure | presage | prick |
| pride | profundity | proud | provoke |
| qualm | queer | rapture | regression |
| regret | resigned | respect | reverence |
| reverent | revulsion | rhapsody | rueful |
| scruple | seizure | sensation | sensationalism |
| sense | sensibility | sentience | sentient |
| sentiment | shadow | shame | shameless |
| smite | smug | sore | sorry |
| soulful | spark | spasmodic | spite |
| spring fever | stifling | stoked | stony |
| strong | supercilious | sway | sympathetic |
| sympathy | tactile | telegraph | tentacle |
| thankless | thing | tight | tingle |
| torpid | tremor | undemonstrative | undertow |
| unfeeling | ungrateful | unguarded | up |
| vigor | violence | vftdol | void |
| wonder | | | |

Appendix 3: Words Representing Emotion

The following is a list of terms that represent human emotions. By using the slider control to denote an affinity or aversion to an emotion, a viewer could use these words to develop a complex personality type for the character. (Source: *American Heritage Electronic Dictionary Third Edition*, published by Houghton Mifflin, copyright 1992.

| | | | |
|---|---|---|---|
| abandon | affect | affecting | affection |
| agony | apathy | aseptic | association |
| awe | blaze | blow | bosom |
| bmin | breast | bubble | burn |
| burst | captive | caustic | center |
| cerebrum | choke | clinical | cold |
| cold-blooded | conniption | convulse | crack |
| cry | delirium | demonstrative | dispassionate |
| drunk | ebullition | ecstasy | electric |
| emote | emotion | emotional | emotive |
| exalt | excite | exclaim | experience |
| feel | feeling | fervent | fervor |
| fiery | fit | flare | flush |
| frantic | fuel | gracious | gust |
| heartthrob | heat | hot | hysteria |
| impass:lve | impersonal | impetuous | incandescent |
| inflame | inflammable | inflammatory | innocuous |
| inspire | interjection | kindle | limbic system |
| love | lump | lyrical | mind |
| misty | mood | motive | move |
| moving | note | obsess | obsession |
| oh | outburst | overcome | overwhelm |
| palsy | paroxysm | passion | passionate |
| passionless | picture | possess | project |
| psyche | quake | rapture | ravish |
| romanticism | rush | safety valve | seizure |
| sensation | sentiment | sentimental | shallow |
| shame | show | simmer | smother |
| soul | spasm | spring tide | stagger |
| stolid | storm | straight face | strength |
| stricken | strike | surrender | swell |
| swing | take | tear | thrill |
| transport | unblinking | vanquish | vehement |
| vibrate | weep | white heat | wild |
| wonder | work | wring | yo-yo |

Although the invention is described herein with reference to the preferred embodiment, one skilled in the art will readily appreciate that other applications may be substituted for those set forth herein without departing from the spirit and scope of the invention. For example, a narrative may be assembled having, for example selectable amounts of violence, sexuality, music, or romance. At the start of the narrative, the viewer selects a desired or appropriate presentation, for example based on a ratings scheme, such as employed by the motion picture industry, i.e. G, PG, PG-13, and R. In this way, a narrative is adapted to suit one's tastes or level of maturity. Thus, a motion picture may be presented to children (by selecting a "G" rating before the motion picture is displayed) and to adults (by selecting an "R" rating before the motion picture is displayed). Additionally, the invention may be employed as a personality inventory in which viewer choices in assembling a narrative or character personality profile reveals aspects of the viewer's personality that might provide useful insights, for example to a career counselor. Accordingly, the invention should only be limited by the claims included below.

We claim:

1. A method for interactive presentation of a narrative in any of motion picture images, television images, computer-based images, computer-generated images, audio transcriptions, tape recordings, computer-based audio, and computer-generated audio, to a viewer of an interpersonal relationship between a first character and a second character, comprising the steps of:

modulating any of said first character's emotions and personality;

varying branches over time of said narrative of said interpersonal relationship in response to said modulation;

constructing a unique narrative from a library of labeled source materials;

selecting character personality traits to program a sequence of scenes derived from said source materials; and presenting such scenes in a unique order that corresponds to a narrative that is consistent with said selected character personality traits.

2. The method of claim 1, wherein said emotions and personality are emotional states that are exhibited for an extended period in the course of many situations and activities within said narrative.

3. The method of claim 1, wherein said modulating step produces gradual branches in said narrative that result in presentation of characters who exhibit transitory feelings and emotional choices that may change over time.

4. The method of claim 1, wherein an inciting incident permits said viewer to choose to modulate an emotional aspect of said first character's personality.

5. The method of claim 1, further comprising the step of:
taking into account said first viewer's desire for an uninterrupted story flow by optionally eliminating any requirement that said viewer make a choice for said narrative to continue, such that when a choice is presented, said viewer may choose to make no choice, whereupon a choice is made for said viewer without interrupting said narrative's flow.

6. The method of claim 5, wherein said choice is either preprogrammed to a set of fixed responses or may be the result of a random choice instituted by a computer.

7. The method of claim 1, further comprising the step of:
developing an alternate narrative for at least one character, where said alternate narrative is a result of emotional choices made for said character by said viewer, and where said narrative has an outcome that could not be inferred by said viewer.

8. The method of claim 1, further comprising the step of:
developing an alternate narrative for at least one character, where said alternate narrative is a result of personality choices made for said character by said viewer, and where said narrative has an outcome that could not be inferred by said viewer.

9. The method of claim 1, further comprising the step of:
cataloging alternate scenes of various length, the order and use of which is a function of one or more characters' personality traits, as selected by said viewer.

10. The method of claim 1, wherein said scenes may be used, if at all, in any sequence that is consistent with a narrative developed around a character having said selected personality traits, such that an extensive number of narrative sequences may be assembled based upon said selected personality traits.

11. The method of claim 1, wherein emotional choices made by said viewer at a beginning of said narrative resonate through said first character's personality throughout presentation of said narrative.

12. The method of claim 1, further comprising the step of:
additionally employing any of mood modifiers, plot changes, and logical choices to make said characters or said narrative more complex.

13. The method of claim 1, wherein said modulating step produces personalities that exhibit widely differing emotional reactions to similar situations within said narrative.

14. The method of claim 1, further comprising the steps of:
asking said viewer a series of questions in the course of said narrative presentation; and
assembling said narrative based upon said viewer's responses, in which one or more characters in said narrative have a specific personality trait.

15. The method of claim 14, further comprising the step of:
having said viewer answer a series of survey questions to describe any of a particular problem or problem person; and
assembling said narrative that most nearly matches said particular problem and/or that presents a character exhibiting personality traits most nearly matching those of said problem person.

16. The method of claim 1, further comprising the step of:
breaking said narrative at points to give said viewer an opportunity to select different actions for said first character in said narrative from among two or more actions that said first character may take.

* * * * *